J. H. HUFFSTUTTER.
FERTILIZER PROCESS AND APPARATUS.
APPLICATION FILED MAY 23, 1922.
1,438,830.
Patented Dec. 12, 1922.
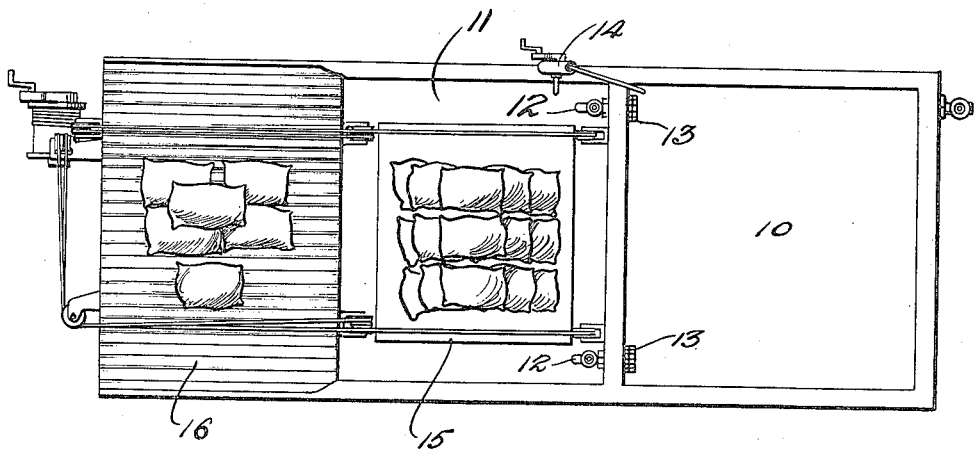
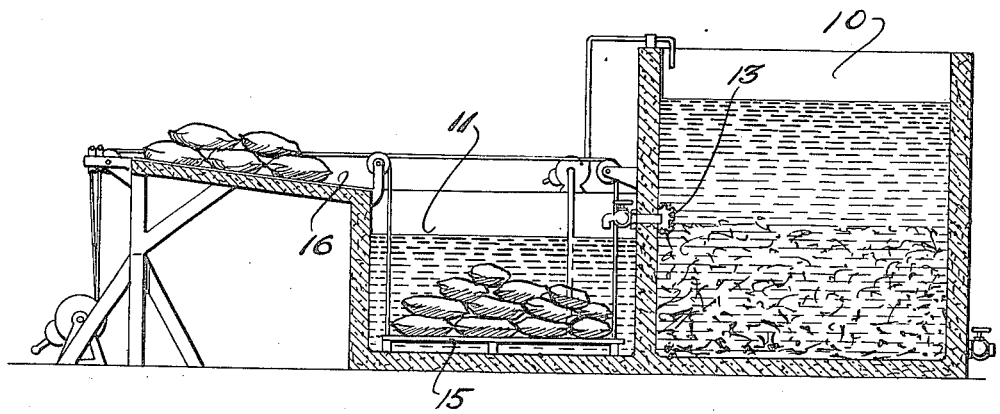
Inventor
James H. Huffstutter
Attorney Patented Dec. 12, 1922.

1,438,830

UNITED STATES PATENT OFFICE.

JAMES H. HUFFSTUTTER, OF KEARNEY, NEBRASKA.

FERTILIZER PROCESS AND APPARATUS.

Application filed May 23, 1922. Serial No. 563,060.

*To all whom it may concern:*

Be it known that I, JAMES H. HUFFSTUTTER, a citizen of the United States, residing at Kearney, in the county of Buffalo, State of Nebraska, have invented certain new and useful Improvements in Fertilizer Processes and Apparatus; and I do hereby declare the following to be a full, clear, and exact description of the invention, such as will enable others skilled in the art to which it appertains to make and use the same.

This invention relates to new and useful improvements in processes and apparatuses for the manufacture of fertilizer.

The principal object of the invention is to provide a process and apparatus by which fertilizer can be manufactured at a very low cost, and with the use of less labor and time, than heretofore.

Another object is to provide an apparatus for the manufacture of fertilizer wherein the liquid is adapted to be returned into the vat, after having drained from the material which is saturated with as much of the liquid as it will absorb.

Other objects and advantages will be apparent from the following description when taken in connection with the accompanying drawing.

In the drawing:

Figure 1 is a plan view of the apparatus for making fertilizer, and embodying one form of the invention.

Figure 2 is a vertical longitudinal sectional view through the apparatus.

Referring particularly to the accompanying drawing, there is shown a vat 10, formed of concrete, or the like, and adjacent the vat is a receptacle 11, having communication with the vat by means of the spout 12, arranged in one corner of the vat and covered with a screen 13, so as to prevent solids escaping, with the liquids, from the vat to the receptacle. Connected to the receptacle 11 is a fluid pump 14, which is used to pump liquid from the receptacle back into the vat, as will be more clearly explained hereinafter. In the receptacle 11 there is mounted an elevator 15, the purpose of which will appear in the description of the operation of the device. On the level of the upper edge of the receptacle there is mounted a drying floor 16, which is inclined toward, and projects over the adjacent edge of the receptacle, as seen in Figure 2.

In the use of the device a quantity of vegetable matter, and stable manure, are placed in the vat 10, and water poured into the vat. This mixture is permitted to stand until the vegetable matter and manure have become decomposed, and the water has become saturated therewith. Into the receptacle, by means of the elevator 15, a number of bags filled with saw-dust, are lowered, and then the spout 12 opened to permit the liquid from the vat to run into the receptacle. When the bags have been completely submerged by the liquid, the spout is closed, and the bags permitted to remain until the saw-dust has become completely saturated with the liquid. The bags are then lifted out of the receptacle, by means of the elevator 15, onto the drying floor 16, and left on this floor, so that the excess liquid will drain back into the receptacle, from whence said excess liquid will be pumped back into the tank or vat. The bags of sawdust, saturated with the liquid, are left on this floor to dry, and when dry, are removed and the contents used on farms, in gardens, and the like, for fertilizing purposes.

What is claimed is:

1. The process of manufacture of fertilizer consisting in impregnating a liquid with decomposed animal and vegetable matter, saturating masses of comminuted vegetable fibre contained in porous containers with such impregnated liquid, and subsequently drying the fibre and containers.

2. The process of manufacturing fertilizer consisting in making a saturate solution of water and decomposed vegetable and animal matter, placing saw-dust in porous bags, placing the bags in a receptacle, submerging the bags in the saturate solution, placing the bags in position to drain the excess liquid into the receptacle, pumping the excess liquid back into the original solution, and subsequently drying the bags and their contents.

3. An apparatus for making fertilizer consisting of a vat, a receptacle adjacent the vat and in liquid communication therewith, a pump connected with the receptacle and in position to discharge into the vat, and a drying floor mounted in position to receive the fertilizer to be dried and to drain excess liquid into the receptacle.

In testimony whereof, I affix my signature, in the presence of two witnesses.

JAMES H. HUFFSTUTTER.

Witnesses:
OLIVER KEAL,
GEORGE BURGERT.